United States Patent
Kons et al.

(10) Patent No.: US 9,484,036 B2
(45) Date of Patent: Nov. 1, 2016

(54) METHOD AND APPARATUS FOR DETECTING SYNTHESIZED SPEECH

(71) Applicant: Nuance Communications, Inc., Burlington, MA (US)

(72) Inventors: Zvi Kons, Haifa (IL); Hagai Aronowitz, Haifa (IL); Slava Shechtman, Haifa (IL)

(73) Assignee: Nuance Communications, Inc., Burlington, MA (US)

( * ) Notice: Subject to any disclaimer, the term of this patent is extended or adjusted under 35 U.S.C. 154(b) by 195 days.

(21) Appl. No.: 14/012,081

(22) Filed: Aug. 28, 2013

(65) Prior Publication Data

US 2015/0066512 A1    Mar. 5, 2015

(51) Int. Cl.
    *G10L 17/22*      (2013.01)
    *G10L 25/51*      (2013.01)
    *G10L 17/26*      (2013.01)

(52) U.S. Cl.
    CPC .............. *G10L 17/22* (2013.01); *G10L 17/26* (2013.01); *G10L 25/51* (2013.01)

(58) Field of Classification Search
    CPC ..... G10L 17/005; G10L 17/22; G06F 21/32; G07C 9/00158; G07C 9/00166
    USPC .......................................... 704/273; 726/1–36
    See application file for complete search history.

(56) References Cited

U.S. PATENT DOCUMENTS

| | | | | |
|---|---|---|---|---|
| 6,081,660 A * | 6/2000 | Macleod | ............... | G10L 17/00 703/2 |
| 6,084,967 A * | 7/2000 | Kennedy et al. | ............ | 380/247 |
| 7,143,039 B1 * | 11/2006 | Stifelman | ............... | G10L 15/22 379/88.01 |
| 7,308,408 B1 * | 12/2007 | Stifelman | ............... | G10L 13/00 704/266 |
| 7,552,054 B1 * | 6/2009 | Stifelman | ............... | G10L 15/22 704/270 |
| 8,594,993 B2 * | 11/2013 | Qian | .................... | G10L 21/003 704/2 |
| 8,898,062 B2 * | 11/2014 | Kato | .................... | G10L 13/033 704/266 |
| 2009/0055193 A1 * | 2/2009 | Maislos et al. | ............... | 704/273 |
| 2009/0089051 A1 * | 4/2009 | Ishii et al. | .................... | 704/225 |
| 2009/0204395 A1 * | 8/2009 | Kato | .................... | G10L 13/033 704/206 |

(Continued)

OTHER PUBLICATIONS

Ogihara, A. et al., "Discrimination Method of Synthetic Speech Using Pitch Frequency Against Synthetic Speech Falsification," Jan. 2005, IEICE Trans. Fundamentals, vol. E88-A. No. 1, XP-001221189, pp. 280-286.*

(Continued)

*Primary Examiner* — Michael N Opsasnick
(74) *Attorney, Agent, or Firm* — Hamilton, Brook, Smith & Reynolds, P.C.

(57) ABSTRACT

Computer systems employing speaker verification as a security approach to prevent un-authorized access by intruders may be tricked by a synthetic speech with voice characteristics similar to those of an authorized user of the computer system. According to at least one example embodiment, a method and corresponding apparatus for detecting a synthetic speech signal include extracting a plurality of speech features from multiple segments of the speech signal; analyzing the plurality of speech features to determine whether the plurality of speech features exhibit periodic variation behavior; and determining whether the speech signal is a synthetic speech signal or a natural speech signal based on whether or not a periodic variation behavior of the plurality of speech features is detected. The embodiments of synthetic speech detection result in security enhancement of the computer system employing speaker verification.

18 Claims, 4 Drawing Sheets

(56) References Cited

U.S. PATENT DOCUMENTS

2010/0088092 A1* 4/2010 Bruhn .......................... 704/228
2015/0066512 A1* 3/2015 Kons ...................... G10L 25/51
  704/273

OTHER PUBLICATIONS

Yang, R. et al., "Detecting Digital Audio Forgeries by Checking Frame Offsets," Proceedings of the IOth ACM Workshop on Multimedia and Security, Sep. 22-23, 2008, Oxford, United Kingdom, pp. 21-26, XPOSSIS8908.*
De Leon, Phillip L. et al., "Detection of Synthetic Speech for the Problem of Imposture," *IEEE*, ICASSP 2011, pp. 4844-4847.
De Leon, Phillip L. et al., "Evaluation of the Vulnerability of Speaker Verification to Synthetic Speech," Odyssey 2010, *The Speaker and Language Recognition* Workshop, Jun. 28-Jul. 1, 2010, Brno Czech Republic, pp. 151-158.
De Leon, Phillip L. et al., "Revisiting the Security of Speaker Verification Systems Against Imposture Using Synthetic Speech," *IEEE*, ICASSP 2010, pp. 1798-1801.
De Leon, Phillip L. et al., "Synthetic Speech Discrimination Using Pitch Pattern Statistics Derived From Image Analysis," 2012, 4 pages.
European Extended Search Report from European Application No. 14181677.7, titled: Method and Apparatus for Detecting Synthesized Speech, Dated: Jan. 5, 2015, 7 pages.
Evans, N. et al., "Spoofing and Countermeasures for Automatic Speaker Verification," Aug. 25-29, 2013, Lyon, France, XP055158979, pp. 925-929.
Wu, Zhizheng et al., "A Study on Spoofing Attach in State-of-the-Art Speaker Verification: The Telephone Speech Case," 2012, 5 pages.
Wu, Zhizheng et al., "Detecting Converted Speech and Natural Speech for Anti-Spoofing Attack in Speaker Recognition," 2012, 4 pages.
Yang, R. et al., "Detecting Digital Audio Forgeries by Checking Frame Offsets," Proceedings of the $10^{th}$ ACM Workshop on Multimedia and Security, Sep. 22-23, 2008, Oxford, United Kingdom, pp. 21-26, XP055158908.

* cited by examiner

METHOD AND APPARATUS FOR DETECTING SYNTHESIZED SPEECH

BACKGROUND OF THE INVENTION

With advances in speech processing techniques, automatic user-machine interaction systems and services are becoming common across different fields. Also, speaker verification techniques are now employed as security measures in many computer systems. In other words, speaker verification is employed to identify authorized users of a computer system and therefore control access to the computer system.

SUMMARY OF THE INVENTION

According to at least one example embodiment, a method and corresponding apparatus for detecting a synthetic speech signal include extracting a plurality of speech features from multiple segments of the speech signal; analyzing the plurality of speech features to determine whether the plurality of speech features exhibit periodic variation behavior; and determining whether the speech signal is a synthetic speech signal or a natural speech signal based on whether or not a periodic variation behavior of the plurality of speech features is detected.

Extracting the plurality of speech features includes, for example, calculating vocal tract transfer function parameters associated with the speech signal, or determining a pitch cycle length or shape associated with the speech signal.

The result(s) of the determination of whether the speech signal is a synthetic speech signal or a natural speech signal may be employed in verifying or identifying a speaker associated with the speech signal, or in determining whether to grant access, to a computer system, to a user associated with the speech signal.

According to at least one example embodiment, analyzing the plurality of speech features includes generating a representation of variability of the plurality of speech features; and performing a periodicity analysis of the representation of variability generated to determine whether the representation of variability exhibits periodic behavior. The representation of variability of the plurality of speech features includes, for example, a ratio of correlation values associated with adjacent pitch cycles of the speech signal, or a distance function illustrating difference between vocal tract transfer function parameters associated with adjacent segments of the multiple segments of the speech signal.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Automatic speech based user-machine interaction services are becoming widely used in a variety of areas such as mobile devices, call centers, banking services, or the like. In many systems employing automatic speech based user-machine interaction, system and user-data security is implemented through speaker recognition techniques. In other words, when a user with an assigned account interacts with a corresponding automatic speech based user-machine interaction system, an utterance spoken by the user is analyzed and the user's voice is automatically recognized by the system. If the user's voice is not recognized, the user is denied access to the system.

Hackers and intruders typically employ synthesized speech to carry malicious attacks on speaker verification systems and gain un-authorized access to users' data. Typically, a speaker verification system may be tricked by using, for example, voice transformation or text-to-speech systems. In other words, hackers or intruders may use voice transformation or text-to-speech methods to generate synthesized utterances with voice characteristics similar to those of a user with an assigned account in the automatic speech based user-machine interaction system. Recordings of the synthesized utterances are then used to access the automatic speech based user-machine interaction system.

According to at least one example embodiment, enhancing the security of systems and services employing user verification is achieved by detecting malicious attacks through the distinction between natural and synthesized speech. In other words, the automatic speech based user-machine interaction system is configured to distinguish between natural speech spoken by human and synthesized speech generated by a computer. The risk of malicious attacks may be reduced by employing synthetic speech detection in order to distinguish between a speech signal generated naturally by a human and a synthetic speech generated by a speech synthesis system.

Figure 1:
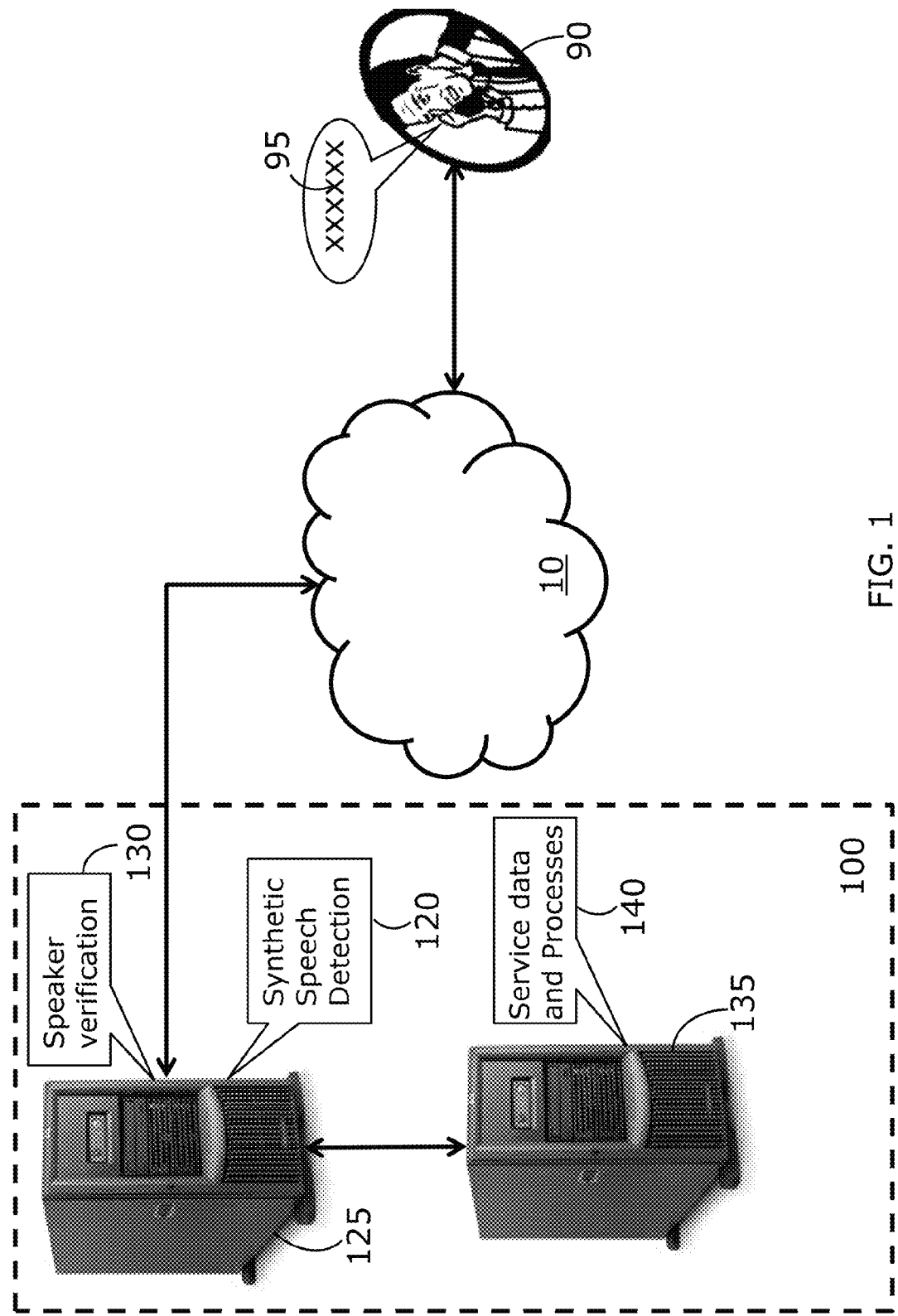
FIG. 1 is a diagram illustrating an automatic speech based user-machine interaction service, according to an example embodiment.

FIG. 1 is a diagram illustrating an automatic speech based user-machine interaction service, according to an example embodiment. A user 90 uses a corresponding user-device to interact with an automatic speech based user-machine interaction system 100. Specifically, the user pronounces one or more utterances 95 into the user device. The speech signal corresponding to the one or more utterances is then transmitted from the user-device to the automatic speech based user-machine interaction system 100 through a communication network 10. The transmission of the speech signal to the automatic speech based user-machine interaction system 100 may be viewed as, or is part of, a request for accessing the system 100.

According to at least one example embodiment, within the automatic speech based user-machine interaction system 100, the speech signal is processed by a synthetic speech detection module 120 in order to determine whether the speech signal is a synthetic speech signal, e.g., generated by a computer, or a natural speech signal spoken by a human. By employing the synthetic speech detection module, the automatic speech based user-machine interaction system 100 is capable of detecting malicious attacks by hackers or intruders. If the speech signal is determined to be a synthetic speech signal, access to service data and processes 140 is then denied. If the speech signal is determined to be a natural speech signal by the synthetic speech detection module 120, a speaker verification module 130 checks whether the speech signal corresponds to a speaker or user known to the automatic speech based user-machine interaction system 100. If the speech signal is mapped to a known speaker, access to service data and processes 140 is then granted, otherwise, access is denied.

In the example embodiment shown in FIG. 1, the synthetic speech detection module 120 and the speaker verification module 130 are implemented within a network computer server 125. Also, the service data and processes 140 are implemented in one or more computer servers 135. A person skilled in the art should appreciate that the automatic speech based user-machine interaction service may be implemented in a different way than the implementation shown in FIG. 1. For example, the synthetic detection module 120 or the speaker verification module 130 may be implemented within a client device such as a mobile device, a personal computer, or the like.

Attackers use synthesized speech that is generated to sound as similar as possible to the speech of a target user to access the automatic speech based user-machine interaction system 100 or user-data stored therein. In generating the synthesized speech, a voice transformation (VT) system may be employed. A VT system modifies an input speech signal and makes the speech signal sound as if it was produced by the target user. Alternatively, a synthetic speech may be generated using a text-to-speech (TTS) system, which transforms a text to a speech with voice characteristics similar to the voice characteristics of the target user.

Most speech synthesis systems, including TTS or VT systems, use an overlap-and-add (OLA) approach with constant frame length. Specifically, the speech synthesis process is performed by synthesizing constant-length speech segments. Speech parameters, e.g., pitch and waveform shape, are first evaluated for each segment. The evaluated parameters are then used for generating the corresponding speech segment. The speech segments are then concatenated with, for example, some overlap. A weighted average applied over a window is typically employed for smoothing the transition between concatenated speech segments. The resulting speech signals consists of constant-length frames, e.g., 5, 10 or 20 millisecond frames, associated with the concatenated segments.

Figure 2:
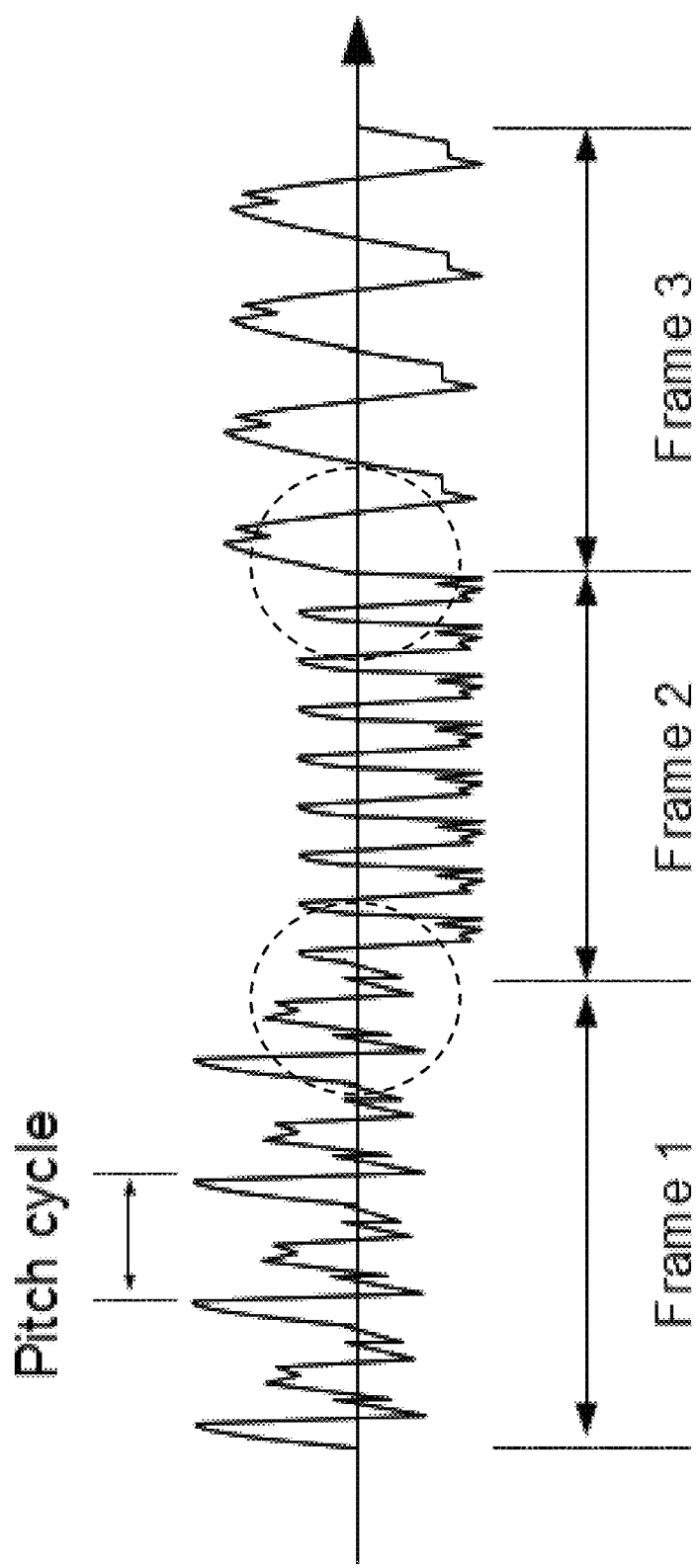
FIG. 2 is plot illustrating a portion of a speech signal generated using the overlap-and-add (OLA) approach.

FIG. 2 is plot illustrating a portion of a speech signal generated using the overlap-and-add (OLA) approach. Given that in synthesizing a speech signal, speech parameters are evaluated for each speech segment, or corresponding frame, the pitch cycle length and the waveform of each cycle, typically, don't change much within a corresponding speech frame. However, the variation in the pitch cycle length or in the waveform of each cycle is typically larger near frame edges. Such variation behavior is illustrated in the plot of FIG. 2. Specifically, the time intervals indicated by the dashed circles represent transition periods from one frame to another, and as such, the indicated time intervals are associated with higher variation in the speech parameters. Within transition periods between speech frames, a synthetic speech signal is typically smoothed as part of the OLA approach. However, even with such smoothing, the speech parameters still exhibit relatively higher variation at transition periods between speech frames than near centers of the speech frames. Such variation behavior is a characteristic of synthetic speech signals and is typically not present in natural speech signals.

According to at least one example embodiment, an approach for detecting synthetic speech includes detecting periodic relatively high variation of speech features associated with a speech signal. In other words, speech features of a synthetic speech signal exhibit relatively high variations at transition periods between speech frames of the same synthetic speech signal as illustrated with regard to FIG. 2. Given that speech frames are typically of constant length, the relatively high variations in speech features occur periodically at time intervals equal to the length of a speech frame. As such, detecting periodic and relatively high variation in speech features of a given speech signal is an indication that the given speech signal is a synthetic speech signal, especially that the periodic high variation behavior usually does not occur in natural speech signals uttered by a human.

A person skilled in the art should appreciate that the periodicity referred to herein relates to the occurrence over time of relatively high variation in speech features associated with a speech signal regardless whether the variations at different time intervals are similar in shape or not. In other words, periodicity as referred to herein does not necessarily imply that the variations occurring at different time intervals are exactly the same. Also, it is to be appreciated that the periodicity in the speech signal is related to the frame length given that the relatively high variation occurs on and around frames' edges.

Figure 3:
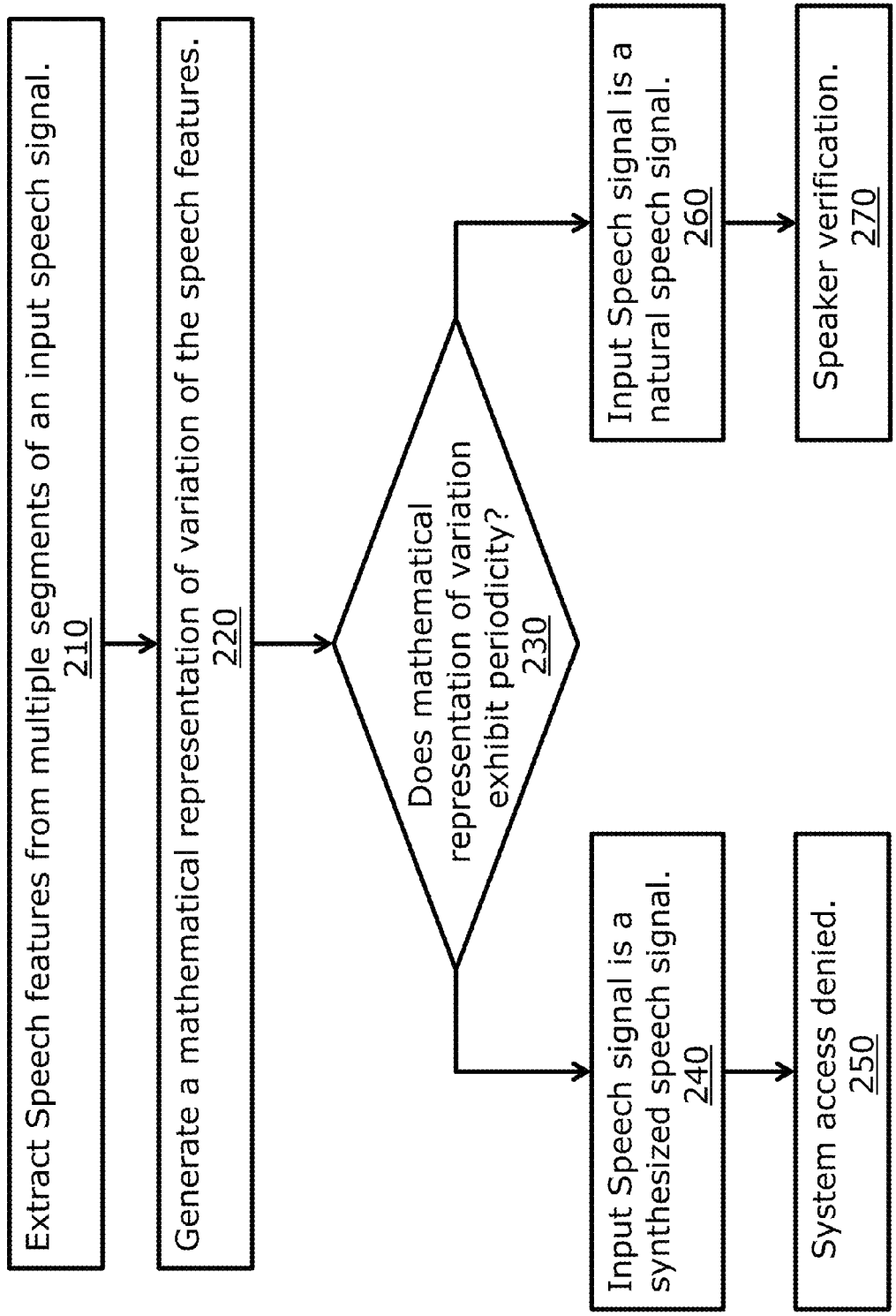
FIG. 3 is a flowchart illustrating a synthetic speech detection method 200, according to at least one example embodiment.

FIG. 3 is a flowchart illustrating a synthetic speech detection method 200, according to at least one example embodiment. At block 210, speech features are extracted from multiple segments of an input speech signal. Examples of the speech features include pitch cycle length and length, vocal tract transfer function parameters, or the like. Examples of vocal tract transfer function parameters include linear predictive coding (LPC) parameters such line spectral frequency (LSF) representation parameters. In extracting the speech features, the speech signal is divided into short segments.

At block 220, a mathematical representation of variation of the extracted speech features is generated. The mathematical representation of variation may be, for example, a function or a variation measure describing the variability of the extracted features over time. In other words, a variability function as referred to herein measures changes of speech parameters within and around the edges of speech frames.

Considering a speech signal x(t), pitch analysis is performed, e.g., using methods known in the art, and a pitch curve p(t) corresponding to the speech signal x(t) is calculated. The pitch curve p(t) represents an approximation of the pitch cycle length at time t. For a speech segment of the speech signal x(t) and, e.g., a speech segment identified by a time interval [t1,t2], a reference time instance is defined, for example, as $$t_m = \underset{t_1 < t < t_2}{\mathrm{argmax}}(|x(t)|).$$

Also, a signal $y(t)=x(t+t_m)$ for $t_m-\frac{1}{2}p(t_m) \leq t \leq t_m+\frac{1}{2}p(t_m)$ is defined. A correlation function $c(\tau)=\int y(t)^* x(t+\tau)dt$ is employed to calculate the length of a pitch cycle as:

$$\tau_l = -\underset{-1.5p(t_m) \leq \tau \leq -0.5p(t_m)}{\mathrm{argmax}}(c(t_m+\tau)).$$

If the pitch cycle is constant around $t_m$ then the correlation for adjacent pitch cycles is expected to be similar. If the length of the pitch cycle, or the pitch cycle shape, changes, then the correlation will be different. A variability function, representing the variability of the pitch cycle length or the cycle shape, is defined at $t_m$ as:

$$f_{pitch}(t_m) = \frac{c_r}{c_l} = \frac{c(t_m + \tau_l)}{c(t_m - \tau_l)}.$$

The procedure of evaluating the variation function is repeated for other pitch cycles at different voiced segments of the signal.

Other variability functions or measures may be defined, for example, based on line spectral frequency (LSF) parameters. Many speech encoding and decoding methods use linear predictive coding (LPC) or line spectral frequencies (LSF) to extract or analyze the vocal tract filter shape. During speech synthesis, LPC or LSF parameters are calculated or updated for each frame. As such, the vocal tract transfer function parameters are expected to change slowly in the middle of speech frames and more rapidly on the edges of speech frames.

Given the speech signal x(t), LSF parameters are calculated over short speech segments or at different time positions $t_n$ of the speech signal x(t). The short speech segments or the time instances $t_n$ are chosen in a way that corresponding time intervals are smaller than expected length of speech frames. The variation function is defined in terms of the distance between two consecutive LSF parameters' sets. That is $$f_{LSF}(t_n) \text{dist}(LSF(t_n), LSF(t_{n+1})).$$

The distance measure maybe, for example, the Euclidean distance.

Once values of the variability function or variability measure, e.g., $f_{pitch}$ or $f_{LSF}$, are generated, a periodicity analysis is performed at block 230 to determine whether the generated variability function, or variability measure, values indicate relatively high periodicity at expected frame intervals. Such periodic behavior, if detected, indicates that the corresponding speech signal x(t) is a synthetic speech signal.

An example method for analyzing the periodicity of the variability function is as follows. For a time-period length of δ, a wrapped time $\tilde{t}$ is defined as $$\tilde{t} = \frac{t \bmod \delta}{\delta}.$$

The wrapped time range $0 \leq \tilde{t} < 1$ is then divided into N equal intervals. For each interval, an average of all the variability function, or variability measure, values corresponding to the same interval is calculated. That is, $$a(n) = avg(f(\tilde{t}_k)) \forall \tilde{t}_k \text{ such that } \frac{n}{N} \leq \tilde{t}_k < \frac{n+1}{N}.$$

A periodicity measure is defined for each δ as:

$$P(\delta) = \left| \sum_{n=0}^{N-1} a(n) e^{2\pi i \frac{n}{N}} \right|.$$

The periodicity measure above may be viewed as a projection of the sequence of averages a(n) onto the first harmonic function $$e^{2\pi i \frac{n}{N}}.$$

A person skilled in the art should appreciate that the periodicity measure may be defined in many other different ways. For example, a simple Fourier analysis of the variability measure may be employed instead of the above function.

Figure 4A:
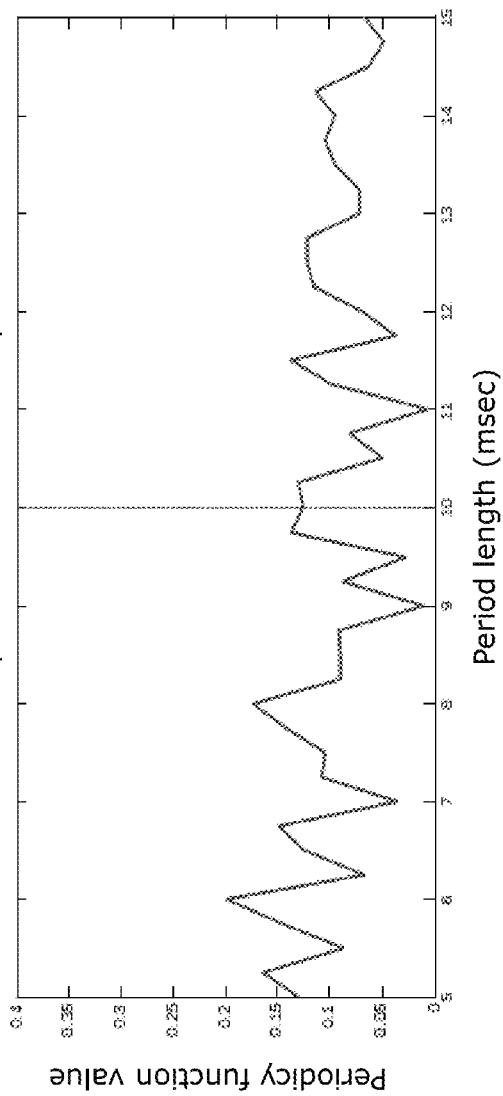
FIGS. 4A and 4B are plots illustrating simulation results indicative of periodicity values associated with, respectively, a natural speech signal and a synthesized speech signal.
Figure 4B:
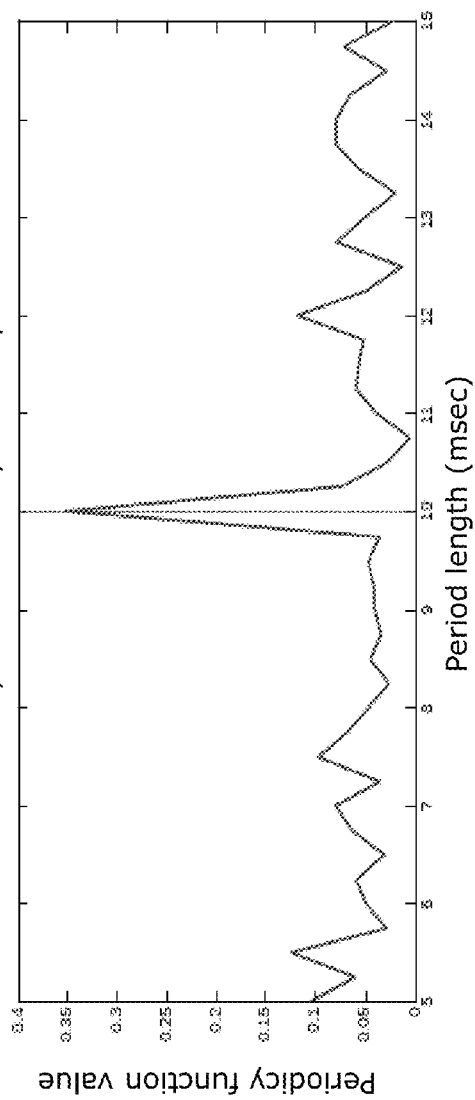

FIGS. 4A and 4B are simulation plots illustrating periodicity measure values associated with, respectively, a natural speech signal and a synthesized speech signal. In the simulations, the periodicity measure values are evaluated using the variability function described above and defined as a ratio of correlation values associated with adjacent pitch cycles. Unlike the natural speech signal, with periodicity measure values shown in FIG. 4A, the periodicity measure values of the synthetic signal, shown in FIG. 4B, exhibit a peak indicative of a period length of 10 milliseconds.

In order to detect a peak of the periodicity measure values, indicative of relatively high periodic variation, a likelihood score may be employed. A score may be defined, for example, in terms of the difference between a periodicity measure value and neighboring, in time, periodicity measure values. Alternatively, given a series of time values $\{\delta_k\}$, e.g., representing potential speech frame lengths, the likelihood score may be defined as:

$$s = \max_k P(\delta_k),$$

or as:

$$s = \max_k (\alpha_k P(\delta_k)),$$

where $\alpha_k$ is a weighting factor. The weighting factor may be for example inversely proportional to $avg(P(\delta_k))$, which represents the average of P(δ) over a range of δ around $\delta_k$. The likelihood score value, for a given speech signal, is then compared to a predefined threshold. If the likelihood score value is larger than the predefined threshold, the corresponding speech signal is marked as a synthetic speech signal.

If the speech signal is determined, at block 230, to exhibit periodic high variations, e.g., based on comparison of the likelihood score to the predefined threshold, the speech signal is determined to be a synthetic speech signal at block 240. As such, the user 90 associated with speech signal is denied access to service data and processes 140. However, if the speech signal is determined, at block 230, not to exhibit periodic high variations, the speech signal is determined at block 260 to be a natural speech signal generated by a human vocal system. Then, at block 270, speaker verification is applied to the speech signal, e.g., by the speaker verification module 130.

Alternatively, upon performing the periodicity analysis, a vector of calculated periodicity measure values is provided as additional information to the speaker verification module 130. The speaker verification module 130 employs the vector of calculated periodicity measure values to determine if the given speech signal is a synthetic speech signal or if a corresponding speaker verification attempt is a legitimate verification attempt. Based on the determination made by the speaker verification module 130, access may be denied or granted to the user 90.

According to at least one example embodiment, the advantage of the synthetic speech detection embodiments described above is that the presented embodiments allow detection of a wide range of synthetic speech signals given that many speech synthesis systems employ OLA with constant frame length.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., that enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device. For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method for a speaker verification system to prevent malicious attacks on protected resources, comprising:
    extracting a plurality of speech features from multiple segments of a speech signal, the speech signal being a synthetic speech signal generated by transforming voice or text with voice characteristics of a user, the speech signal enabling access to protected resources by a requestor;
    analyzing the plurality of speech features to determine whether the plurality of speech features exhibit periodic variation behavior, the analyzing comparing the plurality of speech features at edges of speech frames with the plurality of speech features in middles of the speech frames, the analyzing including:
        generating a representation of variability of the plurality of speech features; and
        performing a periodicity analysis of the generated representation of variability to determine that the generated representation of variability exhibits periodic variation behavior; and
    denying the requestor access to the protected resources based on a determination that the speech signal is a synthetic speech signal based on the exhibited periodic variation behavior.

2. A method according to claim 1, wherein extracting the plurality of speech features includes calculating vocal tract transfer function parameters associated with the speech signal.

3. A method according to claim 1, wherein the plurality of speech features includes determining a pitch cycle length or shape associated with the speech signal.

4. A method according to claim 1 further comprising employing a result of a determination whether the speech signal is a synthetic speech signal or a natural speech signal in verifying or identifying a speaker associated with the speech signal.

5. A method according to claim 1 further comprising employing a result of a determination whether the speech signal is a synthetic speech signal or a natural speech signal in determining whether to grant access, to a computer system, to a user associated with the speech signal.

6. A method according to claim 1, wherein the representation of variability of the plurality of speech features includes one of:
   a ratio of correlation values associated with adjacent pitch cycles of the speech signal; or
   a distance function illustrating difference between vocal tract transfer function parameters associated with adjacent segments of the multiple segments of the speech signal.

7. A method according to claim 1, wherein performing a periodicity analysis of the representation of variability generated includes calculating a periodicity function based on values of the representation of variability generated.

8. A method according to claim 7 further including determining whether the periodicity function exhibits a peak at a point corresponding to a potential speech frame length.

9. A method according to claim 8, wherein determining whether the periodicity function exhibits a peak at a point corresponding to a potential speech frame length includes comparing a value of the periodicity function to a threshold value.

10. An apparatus of a speaker verification system for preventing malicious attacks on protected resources, comprising:
   at least one processor; and
   at least one memory storing computer code instructions thereon,
   the at least one processor and the at least one memory, with the computer code instructions, being configured to cause the apparatus to:
      extract a plurality of speech features from multiple segments of a speech signal, the speech signal being a synthetic speech signal generated by transforming voice or text with voice characteristics of a user, the speech signal enabling access to protected resources by a requestor;
      analyze the plurality of speech features to determine whether the plurality of speech features exhibit periodic variation behavior, the analyzing comparing the plurality of speech features at edges of speech frames with the plurality of speech features in middles of the speech frames, wherein, to perform the analyzing, the at least one processor and the at least one memory, with the computer code instructions, are further configured to cause the apparatus to:
         generate a representation of variability of the plurality of speech features; and
         perform a periodicity analysis of the generated representation of variability to determine that the generated representation of variability exhibits periodic variation behavior; and
      deny the requestor access to the protected resources based on a determination that the speech signal is a synthetic speech signal based on the exhibited periodic variation behavior.

11. An apparatus according to claim 10, wherein in extracting the plurality of speech features, the at least one processor and the at least one memory, with the computer code instructions, are configured to cause the apparatus to calculate vocal tract transfer function parameters associated with the speech signal.

12. An apparatus according to claim 10, wherein in extracting the plurality of speech features, the at least one processor and the at least one memory, with the computer code instructions, are configured to cause the apparatus to determine a pitch cycle length or shape associated with the speech signal.

13. An apparatus according to claim 10, wherein the at least one processor and the at least one memory, with the computer code instructions, are configured to further cause the apparatus to employ a result of a determination whether the speech signal is a synthetic speech signal or a natural speech signal in verifying or identifying a speaker associated with the speech signal.

14. An apparatus according to claim 10, wherein the at least one processor and the at least one memory, with the computer code instructions, are configured to further cause the apparatus to employ a result of a determination whether the speech signal is a synthetic speech signal or a natural speech signal in determining whether to grant access, to a computer system, to a user associated with the speech signal.

15. An apparatus according to claim 10, wherein the representation of variability of the plurality of speech features includes one of:
   a ratio of correlation values associated with adjacent pitch cycles of the speech signal; or
   a distance function illustrating difference between vocal tract transfer function parameters associated with adjacent segments of the multiple segments of the speech signal.

16. An apparatus according to claim 10, wherein in performing a periodicity analysis of the representation of variability generated, the at least one processor and the at least one memory, with the computer code instructions, are configured to cause the apparatus to calculate a periodicity function based on values of the representation of variability generated.

17. An apparatus according to claim 16, wherein the at least one processor and the at least one memory, with the computer code instructions, are configured to further cause the apparatus to determine whether the periodicity function exhibits a peak at a point corresponding to a potential speech frame length.

18. A non-transitory computer-readable medium with computer code instructions stored thereon for a speaker verification system to prevent malicious attacks on protected resources, the computer code instructions when executed by a processor cause an apparatus to:
   extract a plurality of speech features from multiple segments of a speech signal, the speech signal being a synthetic speech signal generated by transforming voice or text with voice characteristics of a user, the speech signal enabling access to protected resources by a requestor;
   analyze the plurality of speech features to determine whether the plurality of speech features exhibit periodic variation behavior, the analyzing comparing the plurality of speech features at edges of speech frames with the plurality of speech features in middles of the speech frames, wherein, to perform the analyzing, the computer code instructions, when executed by the processor, further cause the apparatus to:
      generate a representation of variability of the plurality of speech features; and
      perform a periodicity analysis of the generated representation of variability to determine that the generated representation of variability exhibits periodic variation behavior; and deny the requestor access to the protected resources based on a determination that the speech signal is a synthetic speech signal based on the exhibited periodic variation behavior.

* * * * *